Figure 3:
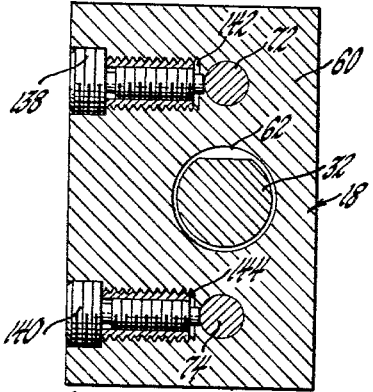

Feb. 16, 1965 L. J. BABACZ 3,169,409
SELECTOR MECHANISM FOR A PUSH-PULL CONTROL SYSTEM
Filed Oct. 26, 1962 2 Sheets-Sheet 1
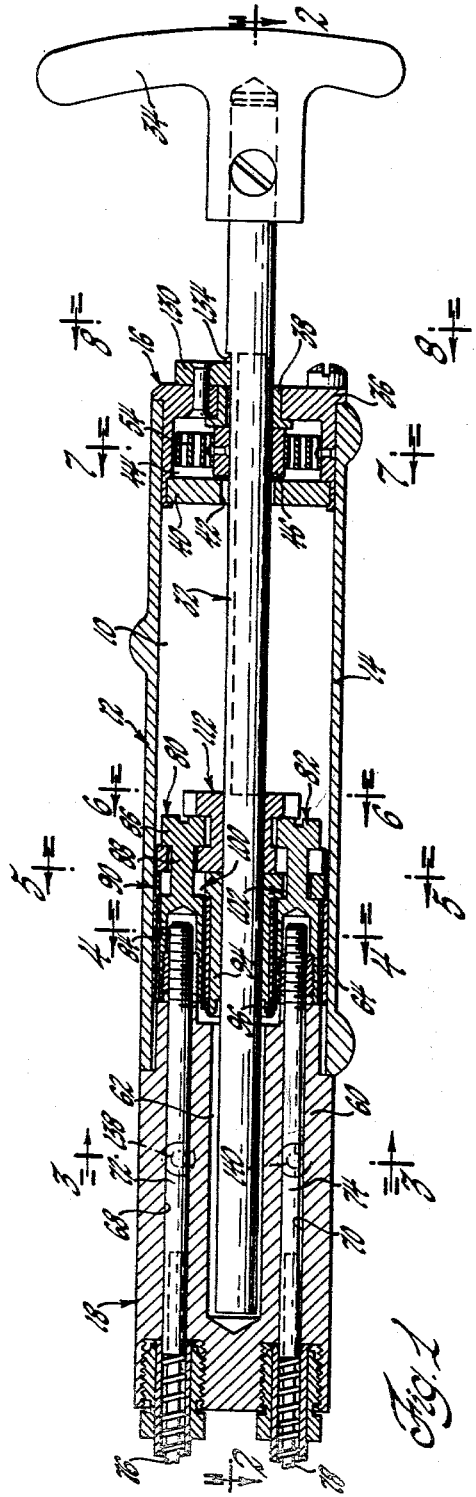
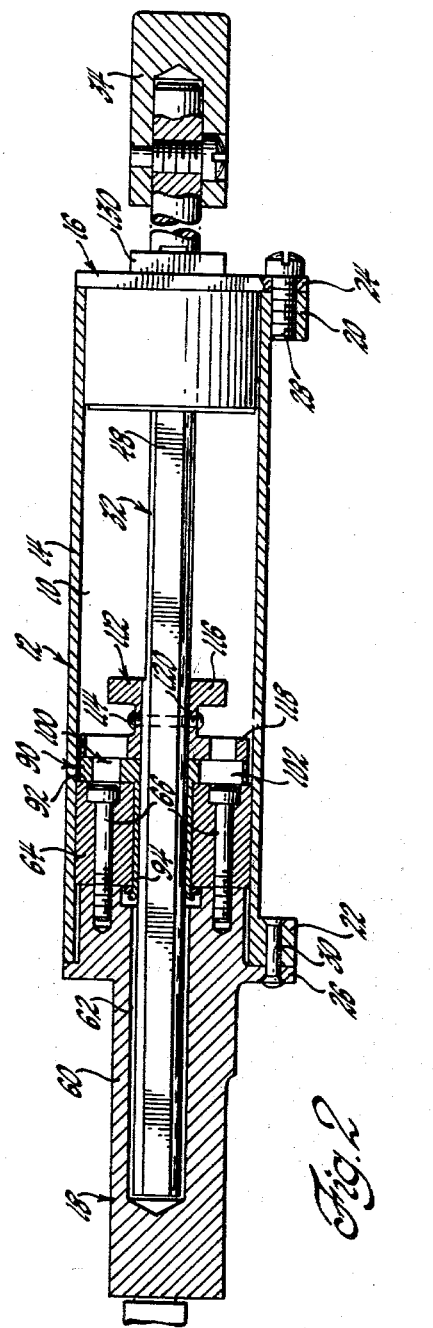
INVENTOR.
Lewis J. Babacz
BY
Barnard & McGlynn
ATTORNEYS INVENTOR.
Lewis J. Babacz
BY
Barnard & McGlynn
ATTORNEYS United States Patent Office 3,169,409
Patented Feb. 16, 1965

3,169,409
SELECTOR MECHANISM FOR A PUSH-PULL
CONTROL SYSTEM
Lewis J. Babacz, Philadelphia, Pa., assignor to Teleflex
Incorporated, North Wales, Pa., a corporation of
Delaware
Filed Oct. 26, 1962, Ser. No. 233,338
11 Claims. (Cl. 74—471)

The present invention relates to a selector mechanism for a push-pull control system. More specifically, the present invention relates to a single control or operating member for use with a system which includes a plurality of push-pull devices to which the member may be selectively coupled to permit longitudinal actuation of one of said members while locking the other member against movement.

The present invention is particularly related to remote control systems in which the operator is located in a position remote from one or more devices which he wishes to control. In this type of situation, it is common to utilize remote control mechanisms involving push-pull members. These types of systems are common in automotive, aircraft and marine environments.

In general, such a push-pull system includes a handle proximate the operator and a flexible or rigid motion transmitting member one end of which is fixed to the operator controlled handle and the other end of which is secured to the mechanism to be operated.

The present invention is concerned with a system in which a single control handle is to be utilized to control a plurality of such push-pull or motion transmitting devices. The use of a single control handle is advantageous from several points of view. First, the system may be such that it is imperative only one device be operated at a time, therefore, if the operating handle is connected to one of such members the other normally cannot be actuated. Secondly, such a single handle system is desirable where space and weight requirements are critical as in aircraft and aerospace applications. The present single control handle system also permits an installation cost reduction by reducing duplication of parts. For any particular system, it is apparent that all of these advantages may exist.

In general, it is old to use a single handle for controlling a plurality of remotely disposed devices. However, previously known devices of this type have had many serious disadvantages overcome by the subject invention. As the name implies, a push-pull device involves transmitting longitudinal movement. Insofar as is known, all previous devices utilizing a single operator controlled handle to actuate a plurality of push-pull devices has involved various combinations of movements between the handle and the particular control selectively coupled thereto. In other words, where a strictly push-pull handle has been used, at best it has been necessary to begin with longitudinal movement of the handle which is converted to rotary movement through suitable lever means and is eventually converted back to longitudinal movement of the motion transmitting or push-pull device. Thus, all previous devices of this general type have involved combinations of longitudinal and rotary movement in transmitting an actuating force between the operating handle and the device being controlled.

In the present invention a unique combination of elements is provided whereby a reciprocating or longitudinally moving handle is selectively connectable to a plurality of motion transmitting members or cables such that longitudinal movement of the handle directly imparts longitudinal movement to the selectively controlled member. In other words, there is no intermediate rotary movement involved in transmitting movement from the handle to the cable. In addition to simplifying the number of parts required for such a mechanism, it is an extremely important advantage that a very compact mechanism is realized through the elimination of various levers and other elements heretofore necessary.

In the embodiment of the invention hereinafter illustrated, a pair of flexible cable members include terminal ends slidably disposed in a housing which also supports a slidable handle element. The handle element is rotatable about its longitudinal axis and includes a collar or selector member adapted to interconnect the handle with one of the flexible cable members while at the same time permitting the handle to be operatively disconnected from the other cable member. In addition, a lock member is mounted within the casing against longitudinal movement but is rotatable with the handle element. The lock member is so arranged that the cable member disconnected from or free of the handle is locked against longitudinal movement. Such a lock provision insures that indiscriminate forces active in the system will not unintentionally move a cable member and further that only the handle can induce longitudinal movement in any of the cable members.

Other objects and advantages of the present invention will become apparent in perusing the detailed description which follows.

Figure 4:
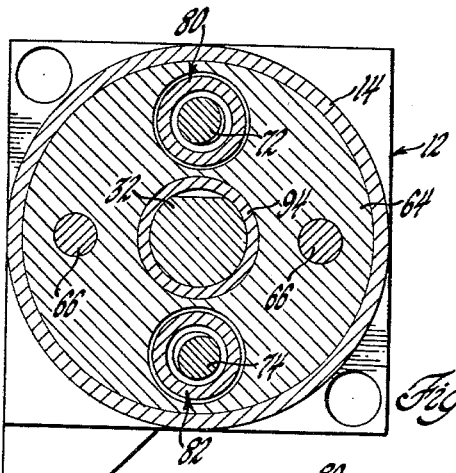
Figure 5:
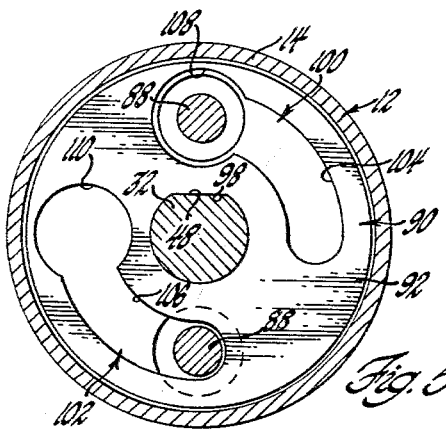
Figure 6:
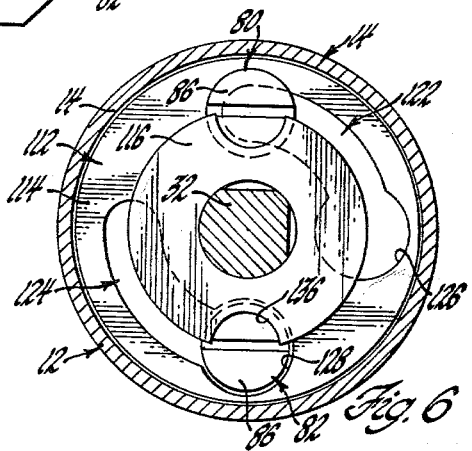
Figure 8:
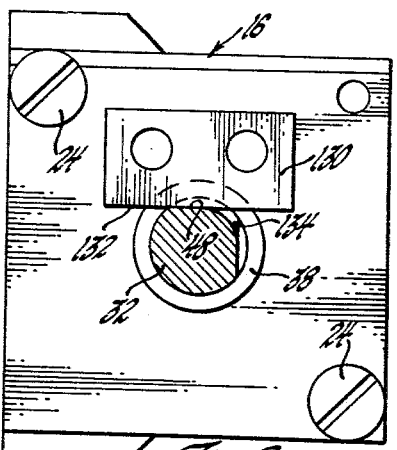
Figure 7:
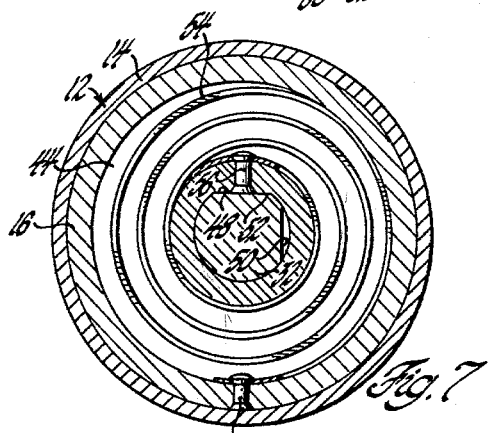

In the drawings:
FIGURE 1 is a plan view of the subject device;
FIGURE 2 is a view substantially along line 2—2 of FIGURE 1;
FIGURE 3 is a view along line 3—3 of FIGURE 1;
FIGURE 4 is a view along line 4—4 of FIGURE 1;
FIGURE 5 is a view along line 5—5 of FIGURE 1;
FIGURE 6 is a view along line 6—6 of FIGURE 1;
FIGURE 7 is a view along line 7—7 of FIGURE 1; and
FIGURE 8 is a view along line 8—8 of FIGURE 1.

Referring generally to FIGURES 1 and 2, a cable actuating selector mechanism is indicated generally at 10 and includes a housing 12 which may be mounted in any convenient manner upon a dashboard or instrument panel proximate the operator. Housing 12 is a built-up structure and includes a main tubular member 14 enclosed by front and rear end fittings 16 and 18. Tubular member 14 has suitable flanges 20 and 22 formed at either end thereof which correspond to flanges 24 and 26 formed on the end fittings and through which flanges suitable fastening means 28 and 30 anchor the fittings within the tubular member.

Front and rear end fittings 16 and 18 include central openings or passages formed therethrough to slidably accommodate a rod member 32 to one end of which operating handle 34 is fixed.

Front fitting 16 includes an end wall 36 having an opening within which a fixed bearing 38 is mounted. The inner end of fitting 16 is enclosed by a disc member 40 having an opening 42 axially aligned with the opening in bearing 38. Fitting walls 36 and 40 define a spring chamber 44 within which a cylindrical sleeve 46 is mounted in concentric relationship to push-pull rod 32. As best seen in FIGURE 7, the portion or rod 32 subadjacent sleeve 46 includes flatted portions 48 and 50 which, in conjunction with a flat surface 52 formed in the sleeve 46, connect the sleeve for rotation with the rod and handle but also permit the rod to move longitudinally relative thereto.

A power spring 54 is also disposed in chamber 44 and is secured at its inner end to sleeve 46 through a rivet 56. The outer end of spring 54 is anchored to front end fitting 16 through a rivet 58. The function of this spring will be subsequently discussed in detail.

Rear end fitting 18 includes a first portion 60 having a central opening or passage 62 therein to slidably receive the inner end of rod 32. A retainer member 64 is fixed to the forward end of end fitting portion 60 through suitable threaded members 66.

A pair of longitudinal passages or openings 68 and 70 are formed through fitting portion 60 and retainer 64 so as to be transversely offset relative to push-pull rod 32, see FIGURE 1. Passages 68 and 70 are adapted to slidably receive rod end portions 72 and 74 of flexible cables 76 and 78.

The inner ends of cable portions 72 and 74 have respectively secured thereto identical terminal members 80 and 82. The terminal members includes a hollow end 84 within which the coacting corresponding end of the cable is fixed, as by threading, and a screw head portion 86 interconnected to the hollow end by a diametrically reduced portion 88.

A lock bearing member 90 includes a radial flange 92 abutting the inner face of retainer 64 and a cylindrical portion 94 extending within the central opening through the retainer member and longitudinally anchored thereto through a suitable lock washer 96. As best seen in FIGURE 5, rod 32 includes flatted peripheral portion 48 which coacts with the correspondingly flatted portion 98 on the central opening through the lock bearing member whereby rotation of the rod will also cause the lock bearing to rotate. On the other hand, it is apparent that lock bearing 90 is axially retained against retainer 64 through lock washer 96 to prevent longitudinal movement of the lock bearing.

Flange portion 92 of the lock bearing member includes a pair of radial key slots 100 and 102, as best seen in FIGURE 5. The slots are radially aligned with the reduced portions 88 of cable terminal members 80 and 82. The slots include portions 104 and 106 slightly larger than reduced portions 88 of the terminal members. The slots also terminate in enlarged portions 108 and 110 of a slightly larger diametral size than that of terminal member portions 84. As seen in FIGURE 5, enlarged portions 108 and 110 of the radial slots are spaced 90° from each other.

Thus, and again referring to FIGURES 1 and 5, with the parts in the position shown, cable terminal member 80 can be moved longitudinally toward the front of housing 12 whereas terminal member 82 is locked against movement. The longitudinal locking of terminal member 82 occurs since the portion 84 thereof is restrained by abutment with the adjacent portion of lock bearing flange 92 surrounding the narrower portion of its coacting radial slot 102. At the same time enlarged slot portion 108 is aligned with end 84 of terminal 80 freeing the latter for longitudinal movement.

Referring to FIGURE 5, it will be seen that rotation of rod 32 through 90° in a counterclockwise direction will lock terminal member 80 against longitudinal movement while placing the enlarged portion 110 of radial slot 102 adjacent the enlarged portion 84 of terminal member 82 thereby freeing the latter for longitudinal movement.

Referring to FIGURE 2, it will be seen that a selector member 112 is secured to rod 32 through a suitable connecting pin or rivet 114. Thus, selector 112 will rotate and move longitudinally with the push-pull rod. Selector 112 includes a pair of longitudinally spaced flange portions 116 and 118 interconnected by a reduced diametral portion 120. Rear flange 118 is substantially of the same size as the I.D. of the tubular portion 14 of housing 12. As best seen in FIGURE 6, selector flange 118 also includes a pair of radial slots 122 and 124 similar to those formed in lock bearing member 90. While these slots are disposed in the same general manner as those in the lock bearing, enlarged portions 126 and 128 thereof are disposed at the opposite ends of the slots relative to those in the lock bearing. In other words, when, and as best shown in FIGURES 1 and 6, terminal member 80 is free to move longitudinally, the narrow portion of radial slot 122 of the selector is disposed behind terminal head 86. At the same time, head 86 of terminal member 82 is aligned with enlarged portion 128 of selector slot 124 whereby the selector may move longitudinally relative to terminal member 82.

Thus, with the parts in the position shown in the drawings, longitudinal movement of rod 32 to the right or forwardly, will cause the terminal member 80 and its associated cable 76 to also be pulled in this direction. Under these same circumstances, terminal member 82 is locked in the position shown and selector member 112 may move away therefrom.

Smaller selector flange 116 is adapted to abut both of the terminal member heads 86 to return or push the respective members to the left or rear when handle 34 and control rod 32 are so moved.

The rightward or pulling movement of handle 34 and rod 32 is limited by the abutting of selector flange 112 against front retainer disc 40. The pushing or leftward movement of the control rod is limited by abutment of the back ends of terminal members 80 and 82 against the inner end of rear retainer 64.

Referring now to FIGURES 1, 2 and 8, a rectangular key member 130 is suitably fixed to the outer surface of front fitting end wall 36. Flatted portion 48 on rod 32 is adapted to abut against the lower face 132 of key member 130 to prevent clockwise rotation of the handle and rod. A radial groove 134 is formed in rod 32 and extends from the flatted portion thereof to permit the rod to be rotated in a counterclockwise direction under certain conditions.

Radial groove 134 is only slightly wider than the thickness of key 130 and is disposed immediately beneath the key when the rod and handle are in the "full in" position. Therefore, handle 34 and rod 32 can only be rotated to select which cable is to be operated when the handle and rod are in the "full in position."

Power spring 54 is so wound as to bias the rod and power handle to the position shown in the drawings and which would be the position in which the operating handle is normally desired. When so desired, the operator may rotate handle 34 in a counterclockwise direction against the force of spring 54 and reverse the operative connection between rod 32 and cable terminal members 80 and 82.

Thus, spring 54 will normally position handle 34 to the illustrated position in which cable 76 is operatively connected thereto and may be moved longitudinally with the handle and during which condition cable 78 is positively locked against any longitudinal movement.

As already noted, terminal members 80 and 82 are secured to cable members 76 and 78 through a threaded connection whereby adjustments in the cable length may be effectuated by inserting a suitable tool to engage terminal member head 86 and rotating the member to lengthen or shorten the overall length of the cable and terminal as desired. To facilitate such adjustment, and as seen in FIGURE 6, selector flange 116 includes peripherally relieved portions 136 whereby a screwdriver can be inserted within housing 12 by removing fitting 16.

Further, and mainly to facilitate assembly of the control mechanism, means are provided for locking the cables in position during assembly. Referring to FIGURES 1 and 3, screw members 138 and 140 are threaded in transverse openings 142 and 144 which communicate with cable passages 68 and 70. During assembly cable rod portions 72 and 74 are inserted within passages 68 and 70 and locked in position by tightening the respective set screws. Once the remainder of the mechanism is assembled, screws 138 and 140 would be loosened.

It is apparent that further structural variations and modifications may be made within the intended scope of the invention as set forth in the hereinafter appended claims.

I claim:
1. A push-pull mechanism comprising:
   a support structure;
   an elongated operating member having a longitudinal axis, said member being supported within said support structure for longitudinal movement;
   a plurality of controlled elements adapted to be selectively controlled by said operating member and supported within said support structure for longitudinal movement substantially parallel to said member axis;
   a terminal member secured to each of said controlled elements and disposed within said support structure;
   and a spool type member fixed to said operating member and having a pair of axially spaced flanges, one of said flanges being adapted to selectively coact with one of said terminal members at a time to move the member in one longitudinal direction and the other of said flanges being adapted to move said terminal members in the other direction.

2. A push-pull mechanism as set forth in claim 1 which also includes a device for selectively and positively locking the other of said plurality of controlled elements against longitudinal movement.

3. The push-pull mechanism set forth in claim 1 wherein said operating member is angularly adjustable about said axis.

4. A push-pull mechanism as set forth in claim 3 which also includes a device connected to said operating member and operable during said angular movement of the latter to positively lock the other of said plurality of controlled elements against longitudinal movement.

5. A push-pull mechanism as set forth in claim 4 in which said locking device is operatively connected to said operating member for angular movement therewith and which locking device is supported within said structure against longitudinal movement, said device including a plurality of angularly spaced slots, each slot including a portion adapted to lockingly engage with one of said controlled elements whereby any element disconnected from the operating member is locked against longitudinal movement by said slot portion.

6. A push-pull mechanism as set forth in claim 5 in which said locking device includes an angularly spaced slot coacting with each controlled element, each slot including a first portion permitting free movement of the controlled element and a second portion adapted to lock said element against movement.

7. A push-pull mechanism as set forth in claim 3 in which said longitudinally movable operating member is movable between a full-in and a full-out position, means coacting with said operating member whereby the latter can only be rotated when in its full-in position.

8. A push-pull mechanism as set forth in claim 7 in which the rotation limiting means comprises a key member associated with said support structure, a flatted surface formed on said operating member and adapted to normally coact with said key member to prevent rotation of said operating member, said member including a peripherally relieved portion disposed proximate said key member only when said operating member is disposed in its full-in position to permit said operating member to be rotated relative to said key member.

9. A push-pull mechanism as set forth in claim 8 which includes spring means for rotatably biasing said operating member to position said flatted surface into abutting engagement with said key member.

10. A push-pull mechanism as set forth in claim 3 which includes spring means for biasing said operating member in one direction about said rotative axis.

11. A push-pull mechanism as set forth in claim 10 in which said spring means includes a coiled spring member concentrically disposed about said operating member and including one end operatively connected to said member and the other end anchored to said support structure.

References Cited in the file of this patent

UNITED STATES PATENTS

| 1,321,645 | Klein | Nov. 11, 1919 |
| 1,567,850 | Long | Dec. 29, 1925 |
| 1,903,360 | Will | Apr. 4, 1933 |
| 2,150,667 | Wheaton | Mar. 14, 1939 |
| 2,295,792 | Jandus | Sept. 15, 1942 |
| 2,461,378 | Grose | Feb. 8, 1949 |
| 2,602,349 | Manning | July 8, 1952 |
| 2,804,944 | Talbott | Sept. 3, 1957 |

FOREIGN PATENTS

| 476,484 | Great Britain | Dec. 9, 1937 |
| 1,097,830 | Germany | Jan. 19, 1961 |